3,776,863
PROCESS FOR THE PRODUCTION OF
PROPYLENE OXIDE POLYMERS
Kyoichiro Shibatani and Shiro Nagata, Kurashiki, Japan, assignors to Kuraray Co., Ltd., Kurashiki City, Japan
Filed May 15, 1972, Ser. No. 253,328
Int. Cl. C08g 23/14
U.S. Cl. 260—2 A                                    10 Claims

ABSTRACT OF THE DISCLOSURE

Solution polymerization of propylene oxide homopolymers and copolymers can be easily conducted in a polymerization system with low viscosity by strictly controlling the polymerization temperature at certain levels within the range of 0° C. and 150° C. and using an aliphatic hydrocarbon having four carbon atoms as a polymerization medium.

Figure 1:
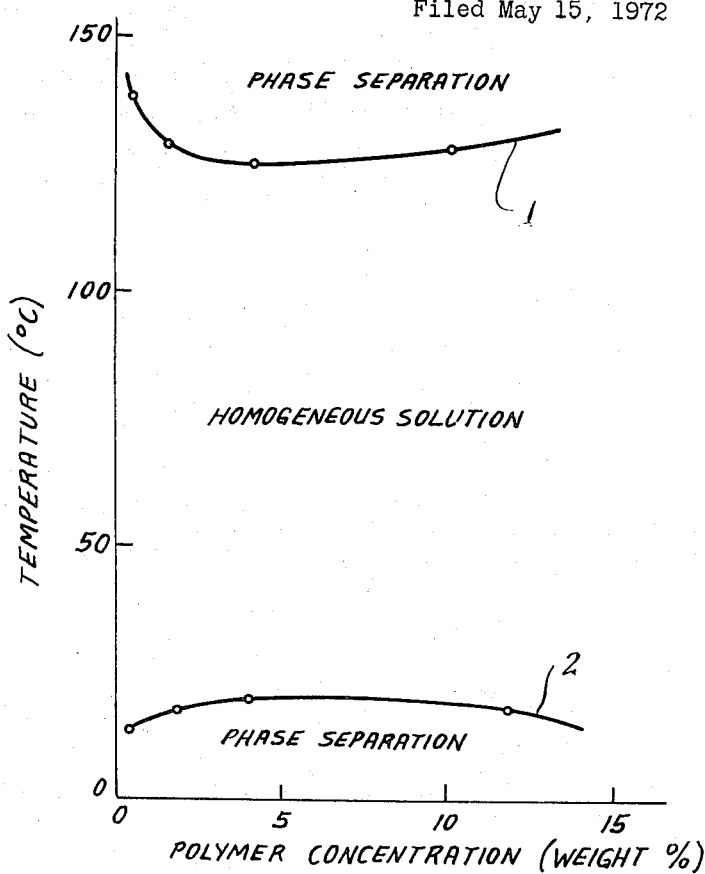

This invention relates to a process for the production of a propylene oxide polymer of high molecular weight in a solution which is separated into two or more than two phases.

It has been well known that useful polymers for synthetic rubbers can be obtained by polymerizing propylene oxide alone or with various comonomers in the presence of an ionic catalyst. Usually, the polymerization is accomplished in a hydrocarbon polymerization medium which is liquid at ordinary temperature and pressure, such as benzene, toluene, n-pentane, n-hexane and the like, and the amount of which is up to twenty times as much as that of the monomer.

However, by such a conventional method, polymerization operation becomes markedly difficult because the reaction system becomes very highly viscous, or attains an extremely viscous lump state as the polymerization proceeds. For example, when propylene oxide is polymerized at 70° C. using $\frac{1}{40}$ mole of catalyst composed of a combination of diethyl zinc and water (described in U.S. Pat. No. 3,385,800) in benzene as a polymerization medium whose volume is 3.8 times as much as that of propylene oxide ("part" and "quantity" are given by volume unless otherwise specified hereinafter), a polymer having molecular weight of about $2.7 \times 10^6$ is obtained. However, the recovery, washing and drying procedures of the polymer thus obtained are extremely difficult to carry out, because the viscosity of the reaction system at the end of the reaction is as high as several ten thousand poises.

The increase of viscosity of the reaction system is generally observed in solution polymerization reactions which produce higher molecular weight polymers such as synthetic rubbers. This tendency is especially noticeable in the polymerization of propylene oxide.

It is possible to reduce viscosity of the polymerization system to an extent that allows easy handling of the system by using a large quantity of polymerization medium, but this has great technical and economic disadvantages not only in that the process causes a decrease in the polymerization rate, but also in that the process requires large apparatus such as the polymerization vessel, recovery equipment for the polymerization medium, and the like. In spite of the excellent properties of propylene oxide polymers as synthetic rubbers for general use, no industrial production of propylene oxide polymers has yet been accomplished because of the technical and economic problems as mentioned above.

It has been found that, when some aliphatic hydrocarbons which are gaseous at ordinary pressure and temperature are used as a polymerization medium for polymerization of propylene oxide by an ionic catalyst under sufficient pressure so that the hydrocarbon medium can be kept in liquid state, and at a polymerization temperature between 0° and 150° C., the polymerization system is separated into two phases (a concentrated phase containing the formed polymer at high concentration, and a dilute phase containing the polymer at low concentration) and the viscosity of the system decreases surprisingly so that stirring of the polymerization system, removal of heat of polymerization and control of the reaction become extremely easy.

However, in this method, when the reaction is continued for a long period of time, depending upon the reaction conditions, the separated concentrated phase firmly sticks to the surface of the wall of the polymerization vessel or to the stirring wings of a stirrer, or the particle size of the slurry becomes so large that transfer of the slurry becomes difficult. Therefore it is evident that more strict determination of reaction conditions is desirable for continuous smooth operation for a long period of time.

The object of the present invention is to conduct the polymerization of propylene oxide by easy operation, particularly, to produce a polymer of high molecular weight by subjecting propylene oxide to homopolymerization or copolymerization without trouble in controlling the polymerization reaction due to increase of viscosity of the system as well as difficulties in the recovery and washing of the produced polymer.

Another object of the present invention is to accomplish the polymerization of propylene oxide smoothly in a polymerization system which is in a state of phase separation.

Still another object of the present invention is to provide, on an industrial scale, a method of producing propylene oxide polymer of high molecular weight having excellent properties as synthetic rubber.

In the case where propylene oxide is polymerized in the presence of an ionic catalyst in a liquid polymerization medium, if the polymerization system is separated into two phases, one phase containing formed polymer at high concentration (including solid phase of precipitated polymer), and the other phase containing said polymer in low concentration, the concentrated phase is dispersed in the dilute phase by stirring, and accordingly the viscosity of the reaction system is maintained at a low value during the polymerization.

However, since the reaction system in the state of phase separation is unstable, the reaction does not proceed smoothly because of the sticking of the separated concentrated phase on the wall of the reaction vessel or on the stirring wings of the stirrer unless the reaction conditions, especially, the reaction temperature, is strictly controlled. The desired temperature depends on the changes in the composition of the polymerization system as the reaction proceeds.

Accordingly, it is important to determine the controlling conditions which enable the commercially satisfactory production of polymers in such a reaction system.

The present invention solves this problem. According to the present invention, the objects mentioned above can be attained by polymerizing propylene oxide at a temperature given by the following relation (1) or (2), at least at the final stage of the polymerization reaction:

$Ta <$ Polymerization temperature $< Ta + 50°$ C.   (1)

$Tb - 50°$ C. $<$ Polymerization temperature $< Tb$   (2)

using, as a polymerization medium, an aliphatic hydrocarbon having 4 carbon atoms or a mixed solvent containing said hydrocarbon as a principal ingredient under sufficient pressure to maintain said medium in a liquid state. In these formulae, $Ta$ is a temperature value obtained by a summation of a product of $Ta_i$ and $V_i$, and $Tb$ is a temperature value obtained by a summation of a product of $Tb_i$ and $V_i$ according to the following Equations 3 and 4 respectively;

$$Ta = \sum_{i=1}^{n} V_i Ta_i \qquad (3)$$

$$Tb = \sum_{i=1}^{n} V_i Tb_i \qquad (4)$$

In Equations 3 and 4, $V_i$ is a volume fraction of each constituent $i$ of polymerization system constituents consisting of monomer and polymerization medium in a polymerization system at room temperature, $Ta_i$ is lower critical solution temperature of a high molecular weight propylene oxide polymer in the constiuent $i$, $Tb_i$ is upper critical solution temperature of a high molecular weight propylene oxide polymer in the constituent $i$, and $n$ is the number of the constituents in the polymerization system.

Figure 2:
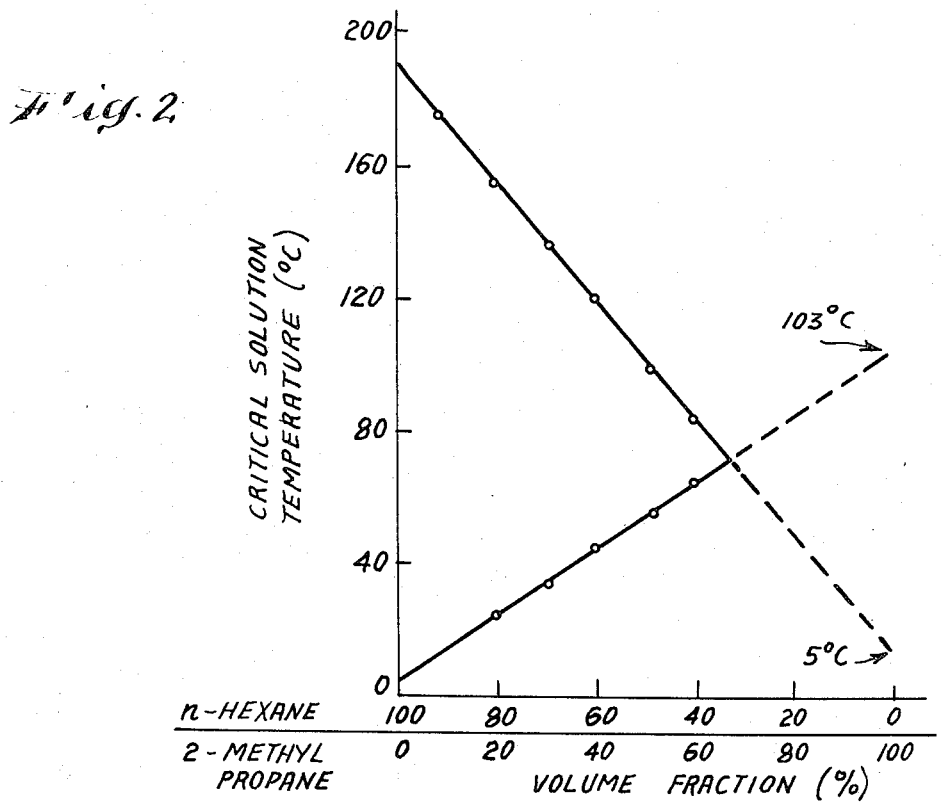

The invention will become more apparent from the ensuing discussion and the attached drawing, wherein:

FIG. 1 is a graphical representation showing the relationship between polymer concentration and the upper and lower critical solution temperatures for a representative system; and FIG. 2 is a graphical representation illustrating a method of calculating the upper and lower critical solution temperatures for a representative polymerization medium.

More detailed explanation are here given for the polymerization system constituents. Said constituents refer to the monomers and polymerization medium which exist in the polymerization system; they do not include the catalyst and polymer produced even if they exist in the polymerization system. Each constituent consists of the same kind of material. Accordingly the number of constituents is equal to the number of monomers and solvents in the polymerization system. For example, when propylene oxide, one comonomer and two kinds of hydrocarbons as a polymerization medium are included in the polymerization system, the number of constituents is 4.

Aliphatic hydrocarbons having 4 carbon atoms and mixed solvents mainly containing said hydrocarbons as the polymerization media must be used in the present invention in order to maintain the viscosity of the polymerization system at low value by giving rise to phase separation of the polymerization system in a temperature range from 0° C. to 150° C. where propylene oxide can be easily polymerized, and in order to realize the smooth continuation of polymerization under easily controllable conditions.

Preferable aliphatic hydrocarbons having a 4 carbon atoms used in the present invention include, for example, alkanes such as n-butane and 2-methylpropane, and alkenes such as n-butene-1, n-butene-2 (both cis and trans) and 2-methyl propene. Among these, n-butane and 2-methylpropane are especially preferable.

As the other solvents mixed with said aliphatic hydrocarbon, aliphatic, alicyclic and aromatic hydrocarbons can be used, so long as they are inert to the catalyst used. For example n-pentane, 2-methylbutane, 2,2-dimethylpropane, n-hexane, 2-methylpentane, 3-methyl pentane, cyclohexane, benzene, toluene and the like may be used. Ethers such as diethylether, dioxane and tetrahydrofuran; halogenated hydrocarbons such as carbon tetrachloride, chloroform, methylene chloride and the like may also be used.

These polymerization media are used in the present innvention under sufficient pressure so that they are in a liquid state at a reaction temperature.

When a polymerization medium other than aliphatic hydrocarbons having 4 carbon atoms or mixed solvent containing said aliphatic hydrocarbon as a main component used alone, the polymerization system does not give rise to a good phase separation at a favourable temperature for polymerization of propylene oxide, that is between 0° C. and 150° C., and therefore, the polymerization system shows extremely high viscosity at the end of the reaction.

According to the present invention, the polymerization system can be turned into the state of phase separation within the favourable temperature range of 0–150° C. by using an aliphatic hydrocarbon of 4 carbon atoms as a polymerization medium. However this does not mean that the phase separation always occurs over this whole temperature range. The phase separation occurs in a certain temperature range within 0–150° C. and the actual temperature range where phase separation actually occurs depends upon the kinds of comonomers, the polymerization medium used and composition of the polymerization system.

Now it has been found that the polymerization of propylene oxide can be accomplished smoothly in a phase separated polymerization system using said polymerization medium by strictly controlling the reaction temperature.

However, the temperature range which enables the smooth polymerization is not constant throughout the reaction period, but varies from the initial stage where monomer concentration is high to the final stage where monomer concentration is low. It also varies with the type of comonomer and the polymerization medium.

Therefore, it is extremely difficult to determine the polymerization temperature at which the polymerization can proceed smoothly from a given comonomer of propylene oxide, polymerization medium, and the amounts used. However, according to the present invention, it is possible to determine the polymerization temperature easily from lower critical solution temperature ($Ta_i$) or upper critical solution temperature ($Tb_i$) of propylene oxide polymer of high molecular weight in a constituent $i$ in the polymerization system constituents consisting of propylene oxide monomer, comonomer, and polymerization medium. Under ordinary circumstances, there is no need to pay attention to the reaction pressure, the quantity and type of catalyst used, or the produced polymer in an ordinary condition. This is one of the advantages of the present invention.

The lower critical solution temperature and the upper critical solution temperature of a high molecular weight propylene oxide polymer in constituent $i$ can be determined as follows.

To constituent $i$ is added a propylene oxide polymer of high molecular weight and the mixture thus obtained is heated or cooled until a homogeneous solution is obtained. This procedure may be carried out, if necessary, under elevated pressure in order to maintain the constituent $i$ in a liquid state. Of course, neither heating nor cooling of the mixture is required when the homogeneous solution is obtained just by adding said polymer to the constituent $i$. The propylene oxide polymer can have a molecular weight of more than 100,000, particularly more than 300,000, which is sufficiently high to show practical properties as a rubber; it may be either a homopolymer or copolymer. The homogeneous solution becomes turbid when phase separation occurs.

The temperature at which the phase separation begins is substantially independent of the molecular weight of the propylene oxide polymer and its molecular weight distribution if the molecular weight of said polymer is sufficiently high; it does, however depend on polymer concentration of said solution. When the solution of constituent $i$ containing the propylene oxide polymer shows phase separation by raising temperature, the lower critical solution temperature ($Ta_i$) is defined as the lowest temperature at which the phase separation begins (this temperature can be easily obtained by changing said polymer concentration). Conversely, when the solution of constituent $i$ shows phase separation on lowering the temperature, the upper critical solution temperature ($Tb_i$) is defined as the highest temperature at which the phase separation begins (this temperature can also be obtained by changing said polymer concentration). Generally, both $Ta_i$ and $Tb_i$ are found for a constituent $i$.

Actually, it is convenient to know $Ta_i$ and $Tb_i$ from the curve obtained by plots of concentration of a propylene oxide polymer in a solution of a constituent $i$ against the temperature at which the phase separation occurs (critical solution temperature). This is further illustrated by example in which 2-methylbutane (isopentane) is used as a constituent of the polymerization system. Propylene oxide homopolymer having intrinsic viscosity ($\eta$) of 2.67 dl./g. (in toluene, at 25° C.) is placed in a hard glass thick-walled test tube. The test tube is deeply cooled and evacuated, and then a certain amount of 2-methylbtuane is charged into the tube by a vacuum distillation technique and the tube is sealed off. The content of the test tube becomes a homogeneous solution on heating the tube at 100° C. and then on warming or cooling, the temperature at which the solution turns to white in color, indicating that phase separation occurs (critical solution temperature), is measured. Curves 1 and 2 in FIG. 1 show the relation between polymer concentration and the two critical solution temperatures, respectively. The lower critical solution temperature is determined as 125° C. from the minimum point of the curve 1, while the upper critical solution temperature is determined as 20° C. from the maximum point of the curve 2.

When a propylene oxide copolymer is used for measurement of the critical solution temperature instead of homopolymer of propylene oxide, the values obtained are not significantly different regardless of what kind of the polymer is used. The difference is negligibly small for the lower critical solution temperature.

The following Table 1 shows $Ta_i$ and $Tb_i$, which are obtained according to the method mentioned above, with respect to the typical constituents used in the polymerization of propylene oxide in the present invention.

TABLE 1

| Constituent $i$ | $Ta_i$ (° C.) | $Tb_i$ (° C.) |
|---|---|---|
| n-Butane | 50 | 48 |
| 2-methylpropane | 5 | 103 |
| n-Butene-1 | ca. 78 | ca. 0 |
| n-Butene-2 (trans) | ca. 103 | ca. 0 |
| n-Butene-2 (cis) | ca. 120 | ca. 0 |
| 2-methylpropene | ca. 95 | ca. 0 |
| Propylene oxide | 200 | −90 |
| Allyl glycidyl ether | 480 | −48 |
| n-Pentane | 135 | 6 |
| 2-methylbutane | 125 | 20 |
| n-Hexane | 190 | 2.3 |
| 2-methylpentane | 167 | 22 |
| 3-methylpentane | 193 | 25 |
| Cyclohexane | ca. 260 | ca. 0 |
| Benzene | ca. 270 | ca. 0 |
| Toluene | ca. 295 | ca. 0 |

Although both $Ta_i$ and $Tb_i$ for a constituent $i$ used in the homopolymerization or copolymerization of propylene oxide can usually be measured as mentioned above, in some cases said temperatures are difficult to determine for a certain constituent $i$. Examples for this can be found in the case where $Tb_i$ is below the melting point of a constituent $i$ and in the case where the homogeneous solution required for measurement of critical solution temperature can not be easily obtained by either heating or cooling the solution of constituent $i$ containing the propylene oxide polymer. An example of a constituent of the former case is benzene; an example of a constituent of the latter is 2-methylpropane (isobutane).

In these cases, the critical solution temperature of the constituent $i$ can be estimated by extrapolation of critical solution temperatures measured for mixed solvents of the constituent $i$ with another solvent at various ratios. This procedure will be further illustrated by example using 2-methylbutane as the constituent $i$.

An appropriate amount of n-hexane, a good solvent for propylene oxide polymer, was mixed with 2-methylbutane and critical solution temperatures were measured by using the mixed solvent thus prepared. The measurements of critical solution temperatures were made for the mixed solvent solutions of propylene oxide polymer with various mixture of n-hexane and 2-methylbutane, and the values of critical solution temperatures were plotted against n-hexane fraction in the mixed solvent as shown in FIG. 2. By extrapolating the plots to zero composition of n-hexane, $Ta_i$ and $Tb_i$ can be estimated for 2-methylpropane as 5° C. and 103° C., respectively. $Ta_i$ and $Tb_i$ thus measured for various solvents are practically independent of the kind of solvent used.

Table 1 can be conveniently used in order to avoid the complicated measurement of $Ta_i$ and $Tb_i$ of a constituent $i$ used for the polymerization of propylene oxide according to the present invention, but $Ta_i$ and $Tb_i$ of a constituent $i$ which is not listed in the Table 1 must be determined according to the method described above. However, $Ta_i$ can be expediently calculated by the equation $$Ta_i = 0.9\ Tc_i - 273$$

where $Tc_i$ is a critical temperature of the constituent $i$ given in absolute temperature. There is not much difference between $Ta_i$ calculated by the above equation and that obtained by measurement according to the method mentioned above. In many cases, $Tb_i$ may be considered to be 0° C.

In the present invention, the polymerization temperature which is required for the smooth polymerization of propylene oxide in the low viscosity polymerization system having separated phases can be determined on the basis of $Ta$ (° C.) or $Tb$ (° C.) calculated from the summation of a product of volume fraction $V_i$ of constituent $i$ in the polymerization system (neither polymerization catalyst nor polymer produced is included as a constituent $i$) and $Ta_i$ or $Tb_i$ of the constituent $i$ according to the following Equation 3 or 4;

$$Ta = \sum_{i=1}^{n} V_i Ta_i \tag{3}$$

$$Tb = \sum_{i=1}^{n} V_i Tb_i \tag{4}$$

In these equations, $n$ is defined as the number of the constituents in the polymerization system. Since the polymerization system has at least two constituents, i.e. propylene oxide and one type of polymerization medium, at least at the initial stage of the reaction, $n$ must be an integer not less than 2 at this stage. By "$Ta$" is meant the temperature below which the propylene oxide polymer formed dissolves homogeneously in the reaction mixture, and above which the polymer dissolves heterogeneously (that is, the reaction mixture is separated into at least two phases, wherein at least one phase contains the formed polymer at relatively high concentration and at least one phase contains the formed polymer at relatively low concentration). By "$Tb$" is meant the temperature above which the propylene oxide polymer formed dissolves homogeneously, and below which the polymer dissolves heterogeneously in the reaction mixture. In other words, at the temperature range between $Ta$ and $Tb$, the polymerization system is in a homogeneous state, and at the temperaure above $Ta$ or below $Tb$ the system is separated into two or more phases.

When phase separation occurs by the polymerization at a temperature above $Ta$ or below $Tb$, viscosity of the polymerization system immediately begins to decrease. However, when the polymerization reaction is performed at a temperature above $Ta+50°$ C. or below $Tb-50°$ C. for a long period of time, there arise troubles, as mentioned above, such as the sticking of the polymer produced on the wall of the reaction vessel or on wings of the stirrer, and difficulties in transfer of slurry-like reaction mixture due to increase in diameter of the particles present in the reaction mixture. Accordingly, in the present invention, the polymerization of propylene oxide should be carried out at a temperature represented by the following Equation 1 or 2:

$$Ta < \text{polymerization temperature} < Ta+50°\ C. \quad (1)$$

$$Tb-50°\ C. < \text{polymerization temperature} < Tb \quad (2)$$

whereby the production of propylene oxide polymers can be performed smoothly in a polymerization system of low viscosity. Particularly, it is preferable to perform the production of the polymers for conventional synthetic rubbers at a temperature given by the following Equation 1′ or 2′:

$$Ta+5°\ C. < \text{polymerization temperature} < Ta+50°\ C. \quad (1')$$

$$Tb-50°\ C. < \text{polymerization temperature} < Tb-5°\ C. \quad (2')$$

As can be seen from Equations 1 to 4 above, the temperature range at which smooth polymerization can be accomplished in the system comprising at least two phases varies with types of comonomer and polymerization medium used. Said temperature range is also dependent upon the reaction time from the initial stage where unreacted monomer is rich in the polymerization system to the final stage where no substantially unreacted monomer is present. Because volume fraction $Vi$ of a constituent $i$ in the polymerization system varies with a lapse of the reaction time (where $$\sum_{i=1}^{n} Vi = 1$$

be constant), $Ta$ or $Tb$ which is given by the Equation 3 or 4 varies therewith. Since the viscosity of the reaction system increases during the latter half period, especially at the final stage of reaction, a polymerization temperature should be determined on the consideration of volume fraction $Vi$ at least at this period so as to decrease the viscosity of the reaction system at the final stage of the reaction. In batch-wise polymerization, the reaction may be carried out in a homogeneous system during the first half stage where the viscosity of the reaction system is not so high and in the latter half, especially at the final stage, the polymerization should be carried out at a temperature given by the Equation 1 or 2 which will induce phase separation of the reaction system. However, as is shown later by way of examples, it is desirable in the invention, to carry out the polymerization consistently within the overlapping temperature range which is included in the temperature range given by the Equation 1 or 2 not only for the final stage of the reaction but also for the initial stage of the reaction. By so doing temperature control of the reaction system can be very easily accomplished. In continuous polymerization, the reaction should be carried out in the temperature range given by the Equation 1 or 2 throughout the polymerization.

Ionic catalysts used in the present invention for producing propylene oxide polymer have no particular limitation so long as they are of sufficiently high activity to produce a polymer of molecular weight of at least 100,000, and preferably more than 1,000,000. Suitable examples of such catalyst systems and those prepared by using an organic compound of a metal belonging to the groups II and III in the periodic table as at least one component; examples are diethyl zinc, dipropyl zinc, triethyl aluminum and diethyl aluminum chloride. Other suitable catalyst systems include a halogenated iron-alkylene oxide catalyst system, a Friedel-Crafts type catalyst system, and a catalyst system containing metallic salts of carbonate, phosphate, and ammonium salts or cyanide compounds.

The catalyst systems suitable for this invention and the general method of polymerization of propylene oxide are disclosed for example, in U.S. Pats. No. 3,385,800, 3,399,149, 3,432,445, 2,934,505 and 3,442,876, British Pats. Nos. 927,817, 937,164, 1,073,266 and 1,150,941. In order to increase activity of catalyst and produce the polymer economically, it is desirable to perform the polymerization reaction at a temperature not lower than 0° C. The properties of propylene oxide polymer prepared at relatively low temperature are generally superior to those of the polymer prepared at relatively high temperature, and, in order to avoid thermal degradation, the polymerization temperature should be not higher than 150° C. On consideration of the effects mentioned above, polymerization temperature should be between 0° C. and 150° C., most preferably, between 70° C. and 120° C. in the process of this invention. When the conventional polymerization catalyst is used, it is recommended that polymerization be performed at a temperature given by the Equation 1 above and the operation of recovering, washing and other procedures for the resultant polymer be also performed at a temperature within temperature range given by Equation 1. Since the temperature given by the Equation 2 above is relatively low and often below 0° C., use of this temperature in the present invention is less frequent. Most favourable polymerization temperature range in the present invention is expressed by the following Equation 1″, $$Ta+5°\ C. < \text{polymerization temperature} < Ta+30°\ C. \quad (1'')$$

Comonomers used for the production of copolymers comprising propylene oxide as a main component are the ones which are copolymerizable with propylene oxide, for example, saturated or unsaturated oxirane compounds such as allylglycidyl ether, butadiene monoxide, 4-vinyl cyclohexene oxide, glycidyl acrylate, glycidyl methacrylate, crotyl glycidyl ether, phenyl glycidyl ether, cyclooctadiene monoxide, hexadiene monoxide, isobutylene monoxide, cyclohexene oxide, styrene oxide, epichlorohydrin, ethylene oxide, phenyl glycidyl ether, cyanocyclohexene oxide, cyanoethyl glycidyl ether and butadiene dioxide; dienes such as butadiene and isoprene; vinyl compounds such as styrene; and other compounds which can be copolymerized with propylene oxide.

It is one of the advantages of the invention that a temperature which polymerization proceeds very smoothly can be easily calculated from the Equation 1 or 2, even when comonomers mentioned above are used. $Ta$ or $Tb$ in the Equation 1 or 2 can be calculated from the values of $Tai$ and $Tbi$ of constituent $i$ listed in Table 1. When another comonomer or a solvent other than one listed in Table 1 is used, $Tai$ and $Tbi$ can be determined either by thes procedure mentioned above or by calculation with use of expedient equations as $$Tai = 0.9\ Tci - 273$$

(where $Tci$ is defined as a critical temperature of comonomer or solvent given in absolute temperature) or $Tbi = 0°$ C.

As the polymerization media in the present invention, it is preferred to use a mixed solvent containing an aliphatic hydrocarbon of four carbon atoms as a main component (e.g., at least 50 vol. percent and preferably at least 65 vol. percent) and a relatively higher boiling hydrocarbon such as n-pentane, 2-methylbutane, n-hexane, 2-methyl pentane, cyclohexane, benzene and toluene, rather than a single solvent consisting of one of the above $C_4$ hydrocarbons. From consideration of practical operation of polymerization, either batch-wise or continuous type, and easiness of removing solvent from the recovered polymer, purification and drying of the resulted polymer, it is most desirable to use a mixture of n-butane or isobutane, and a pentane or hexane at a suitable mixing ratio as the polymerization medium.

In performing the present invention it is convenient that suitable temperature is at first determined on consideration of a catalyst used and then, suitable monomer concentration and composition of polymerization medium are selected so that said temperature can be within the temperature range given by the Equation 1 or 2. According to the invention, even when polymerization temperature and monomer concentration have previously been determined, said temperature can be fitted to a temperature in the temperature range expressed by the Equation 1 or 2 by selecting suitable composition of mixed solvents based on the Equation 3 or 4 above-mentioned. Also, even when concentration of propylene oxide monomer and a comonomer has previously been determined, favourable polymerization temperature for a catalyst used can be chosen by varying the kind or the composition of the polymerization medium, based on the Equation 3 or 4.

The following examples are cited to illustrate the invention. In the examples, all "percentages" and "parts" are by volume unless otherwise indicated.

EXAMPLE 1

Polymerization conditions for propylene oxide were predetermined with use of the catalyst prepared from diethyl zinc and water, at initial monomer concentration of 10% (polymerization medium of 90%) at a temperature of 75° C. during the reaction.

A suitable polymerization medium was reached by using the Equation 3 and figures listed in Table 1. As explained below, it was found suitable to use the mixed solvent of 2-methylpropane and n-hexane as a medium at a mixing ratio such that the polymerization system consists of 10% of propylene oxide monomer, 65% of 2-methyl propane and 25% of n-hexane. $Ta_i$'s are 200° C. for propylene oxide monomer, 5° C. for 2-methyl propane and 190° C. for n-hexane. Putting these figures in the Equation 3, $Ta$ of the polymerization system at the time before starting polymerization is calculated to be $$(0.10 \times 200) + (0.65 \times 5) + (0.25 \times 190) = 70.8° C.$$

Whereas, $Ta$ at the time after completing polymerization is calculated to be 56.4° C.

$$[(0.65/0.90) \times 5 + (0.25/0.90) \times 190 = 56.4° C.]$$

as volume fraction of propylene oxide becomes 0 ($Vi=0$).

Thus by using the above polymerization medium, the reaction can be carried out from start to end at a temperature within the temperature range calculated from the Equation 1. In other words, the temperature range which satisfies the Equation 1 both at the initial and the final stages of the reaction lies between 70.8° C. and 56.4° C.+50° C. (=106.4° C.) and so, at the given temperature of 75° C., polymerization can be performed smoothly from start to finish.

An autoclave reaction vessel with a stirrer was purged and dried with dry nitrogen gas. Under cooling to about −40° C., in the vessel were placed 130 parts of 2-methylpropane, 50 parts of n-hexane, 20 parts of propylene oxide, 0.13 part (by weight) of water and 0.80 part (by weight) of diethyl zinc. The temperature was then raised to 75° C. with the vessel tightly closed. The pressure in the vessel became about 10 atm. Before the reaction, a small amount of white precipitant of catalyst was found in the vessel; as the reaction proceeded, the polymerization system became turbin white in color, followed by becoming slurry-like. However, the viscosity of the polymerization system did not increase markedly and stirring was conducted easily with a conventional stirrer. When stirring was stopped temporarily, the polymerization system was separated into two phases, one phase which has a slightly higher concentration of the formed polymer and the other phase which has slightly lower concentration of the polymer. By beginning agitation again after the short stopping time, the polymerization system returned to form a slurry-like mixture. Up to ten hours of polymerization time the system remained at low viscosity and the agitation of the system could be carried out very effectively. This was completely different from the system which uses one type of conventional solvent such as benzene, n-hexane or the like. Furthermore, there was no adhesion of the polymer produced on the wall of the polymerization vessel or on the wings of the stirrer, and there was no crumb formation of large particle size during the reaction; thus operation of the process could be made very simple. After the polymerization period of 10 hours, unconverted propylene oxide and polymerization medium were removed to give 18 parts (calculated by monomer volume) of propylene oxide polymer. The intrinsic viscosity of the polymer was 8.0 dl./g. in benzene at 25° C.

EXAMPLE 2

Polymerization conditions of 20 parts of propylene oxide, 180 parts of polymerization medium, and 0.8 part (by weight) of diethyl zinc and 0.5 part (by weight) of 1.3 - propandiol as a catalyst at 100° C., were predetermined.

As a result of survey for a suitable medium which reduces viscosity of the polymerization system by phase separation and leads to easy operation of the reaction at above-mentioned polymerization temperature, using the Equations 3 and Table 1, a mixture of 140 parts of n-butane and 40 parts of n-hexane was found to be suitable. Because $Ta$ of this polymerization system was 93° C. before the reaction and 81° C. at the end of the reaction according to the Equation 3, the polymerization operation could take place at a temperature between 93° C. and 131° C.

Following the procedure of Example 1, polymerization was carried out for 5 hours. The reaction proceeded very smoothly to nearly 100% of polymer yield. The intrinsic viscosity of the polymer was 3.48 dl./g.

EXAMPLE 3

Using the polymerization system consisting of 20 parts of propylene oxide, 140 parts of n-butane, 40 parts of 2-methylbutane and, as a catalyst, 0.8 part (by weight) of diethyl zinc and 0.13 part (by weight) of water, the polymerization reaction was performed at 80° C. Following the procedure of Example 1, the polymerization was continued for 5 hours to nearly 100% of polymer yield giving a polymer of intrinsic viscosity of 8.4 dl./g. $Ta$ in the system calculated from the Equation 3 was selected to be 80° C. at the initial stage and 66.7° C., at the end of the reaction. Processing operation was as smooth as Examples 1 and 2.

EXAMPLE 4

To a monomer mixture of 110 parts of propylene oxide and 10 parts of allyl glycidyl ether was added 1.60 parts (by weight) of diethyl zinc and then 0.27 part (by weight) of water. The resulting mixture was placed in a high pressure polymerization vessel (with a stirrer) which had been purged with nitrogen gas. 410 parts of dried commercial butane (82% of n-butane and 18% of 2-methyl propane) and 70 parts of n-pentane were put in said vessel and polymerization was carried out under stirring at 70° C. In the beginning of the reaction, the system did not show any slurry-like appearance except white turbidity due to catalyst. The viscosity of the system increased as the polymerization proceeded. However, as the polymerization proceeded further, the medium became slurry-like and the viscosity of the system was reduced because of the resultant phase separation. After completion of the polymerization reaction, the stirring was continued for further 24 hours, but no change in viscosity was observed at all. A polymer having intrinsic viscosity of 10.3 dl./g. was obtained with about 100% of polymer yield.

In this polymerization system, $Ta$ was 89° at the initial stage, 74° C. at the time of 50% polymerization and 55.5° C. at the end of the reaction according to the Equation 3.

EXAMPLE 5

As an example of the reaction carried out in a temperature range given by the Equation 2, 10 parts of propylene oxide was polymerized at 35° C. in 90 parts of n-butane in the presence of a catalyst having 0.40 part (by weight) of polytetramethylene glycol of molecular weight of 2,000 and 0.03 part (by weight) of diethyl zinc. Following the procedure of Example 1, the reaction was carried out for 48 hours with smooth operations in a state of phase separation. A polymer having intrinsic viscosity of 4.2 dl./g. in benzene at 25° C. was obtained.

What is claimed is:

1. A process for preparing a propylene oxide polymer in a liquid polymerization medium which comprises, using as the polymerization medium an aliphatic hydrocarbon having 4 carbon atoms or a mixed solvent containing at least about 50% of said hydrocarbon at sufficient pressure to maintain said medium in a liquid state, carrying out the polymerization at a temperature given by the following Equation 1 or 2 at least in the last half period of the reaction:

$Ta<$polymerization temperature$<Ta+50°$ C. (1)
$Tb-50°$ C.$<$polymerization temperature$<Tb$ (2)

wherein $Ta$ is a temperature value obtained by a summation of a product of $Tai$ and $Vi$, and $Tb$ is a temperature value obtained by a summation of a product of $Tbi$ and $Vi$ according to the following Equations 3 and 4:

$$Ta = \sum_{i=1}^{n} ViTai \quad (3)$$

$$Tb = \sum_{i=1}^{n} ViTbi \quad (4)$$

wherein, $Vi$ is the volume fraction at room temperature of each constituent $i$ of the polymerization system consisting of each monomer and each component of the polymerization medium, $Tai$ is a lower critical solution temperature of a high molecular weight propylene oxide polymer in the constituent $i$, $Tbi$ is an upper critical solution temperature of a high molecular weight propylene oxide polymer in the constituent $i$, and $n$ is the number of constituents $i$ in the polymerization system.

2. A process according to claim 1, wherein the polymerization medium is an alkane or alkene having 4 carbon atoms.

3. A process according to claim 2 wherein the polymerization medium is n-butane or 2-methylpropane.

4. A process according to claim 1 wherein the polymerization medium is a mixed solvent containing at least about 50% of n-butane or 2-methylpropane, and a hydrocarbon selected from the group consisting of n-pentane, 2-methyl butane, n-hexane, 2-methylpentane, 3-methylpentane, cyclohexane, benzene and toluene.

5. A process according to claim 1 wherein the propylene oxide polymer prepared is a homopolymer of propylene oxide.

6. A process according to claim 1 wherein the propylene oxide polymer prepared is a copolymer of propylene oxide and a comonomer selected from the group consisting of allyl glycidyl ether, butadiene monoxide, glycidyl methacrylate, crotyl glycidyl ether, phenyl glycidyl ether, ethylene oxide, isobutylene oxide, cyclohexene oxide, styrene oxide, epichlorohydrin, and styrene.

7. A process according to claim 1 wherein the temperature is maintained in the temperature range given by Equation 1 or 2 throughout the polymerization reaction.

8. A process according to claim 1 wherein the reaction temperature is given by the following Equation 1' or 2'

$Ta+5°$ C.$<$polymerization temperature$<Ta+50°$ C. (1')
$Tb-50°$ C.$<$polymerization temperature$<Tb-5°$ C. (2')

9. A process for preparing a propylene oxide polymer in a liquid polymerization medium which comprises, using the polymerization medium, an alkane or alkene having 4 carbon atoms or a mixed solvent containing at least about 65% of said alkane or alkene at sufficient pressure to maintain said medium in a liquid state, carrying out the polymerization at least at the final stage of the reaction at a temperature given by the following equation $Ta+5°$ C.$<$polymerization temperature$<Ta+30°$ C. wherein $Ta$ is a temperature value obtained by a summation of a product of $Tai$ and $Vi$ according to the following equation $$Ta = \sum_{i=1}^{n} ViTai$$

wherein $Vi$ is a volume fraction at room temperature of each constituent $i$ of the polymerization system consisting of each monomer and each component of the polymerization medium, $Tai$ is a lower critical solution temperature of a high molecular weight propylene oxide polymer in the constituent $i$, and $n$ is the number of constituents $i$ in the polymerization system.

10. A process according to claim 9 wherein the temperature is maintained in the temperature range there given throughout the polymerization reaction.

References Cited

UNITED STATES PATENTS

| | | | |
|---|---|---|---|
| 3,466,251 | 9/1969 | Fukui et al. | 260—2 |
| 3,468,817 | 9/1969 | Hsieh | 260—2 |
| 3,483,135 | 12/1969 | Hsieh | 252—431 |
| 3,546,134 | 12/1970 | Wofford et al. | 252—431 |

WILLIAM H. SHORT, Primary Examiner

E. A. NIELSEN, Assistant Examiner

U.S. Cl. X.R.

260—47 EP, 88.3 A, 615 B

UNITED STATES PATENT OFFICE
CERTIFICATE OF CORRECTION

Patent No. 3,776,863    Dated December 4, 1973

Inventor(s) Kyoichiro Shibatani et al

It is certified that error appears in the above-identified patent and that said Letters Patent are hereby corrected as shown below:

Column 3, line 53, delete "a".

Column 8, line 51, delete "thes" and insert --the--.

Column 12, line 29, insert --5°C <-- after "<" (first occurrence).

Signed and sealed this 15th day of October 1974.

(SEAL)
Attest:

McCOY M. GIBSON JR.
Attesting Officer

C. MARSHALL DANN
Commissioner of Patents